(12) United States Patent
Boncha et al.

(10) Patent No.: US 8,249,944 B2
(45) Date of Patent: Aug. 21, 2012

(54) METHOD FOR DYNAMIC ORDERING AND MATERIAL USAGE AND LABOR PRICING

(75) Inventors: Scott L. Boncha, Chardon, OH (US); Dale B. McCartney, Chardon, OH (US); Brian S. Strollo, Parma, OH (US); Paul A. Geoffrion, Madison, OH (US)

(73) Assignee: Scott L. Boncha, Chardon, OH (US)

( * ) Notice: Subject to any disclaimer, the term of this patent is extended or adjusted under 35 U.S.C. 154(b) by 114 days.

(21) Appl. No.: 12/954,288

(22) Filed: Nov. 24, 2010

(65) Prior Publication Data
US 2011/0166953 A1 Jul. 7, 2011

Related U.S. Application Data

(60) Provisional application No. 61/263,851, filed on Nov. 24, 2009.

(51) Int. Cl.
*G06Q 30/00* (2012.01)
(52) U.S. Cl. ...................................... 705/26.4; 705/26.5
(58) Field of Classification Search .................. 705/26.1, 705/27.1, 26.4, 26.5
See application file for complete search history.

(56) References Cited

U.S. PATENT DOCUMENTS

| | | | | |
|---|---|---|---|---|
| 6,009,406 A * | 12/1999 | Nick | ............................ | 705/7.24 |
| RE36,602 E * | 3/2000 | Sebastian et al. | ............... | 700/97 |
| 6,470,228 B1 * | 10/2002 | Turner et al. | ..................... | 700/97 |
| 7,177,713 B2 * | 2/2007 | Smith et al. | ...................... | 700/97 |
| 7,177,833 B1 * | 2/2007 | Marynowski et al. | ........... | 705/38 |
| 7,346,588 B2 * | 3/2008 | Shimizu et al. | ................ | 705/400 |
| 7,496,528 B2 * | 2/2009 | Lukis et al. | ................... | 705/26.4 |
| 7,840,443 B2 * | 11/2010 | Lukis et al. | ................... | 705/26.4 |
| 2007/0038531 A1 * | 2/2007 | Lukis et al. | ..................... | 705/26 |
| 2009/0125418 A1 * | 5/2009 | Lukis et al. | ..................... | 705/26 |

OTHER PUBLICATIONS

Feb. 2009—http://pl-wa.org/sites/default/files/documents/archives/USDOA_Forest_Service_Cost_Estimating_Guide_for_Road_Construction_Feb-2009.pdf.*

* cited by examiner

*Primary Examiner* — Matthew Zimmerman
(74) *Attorney, Agent, or Firm* — White-Welker & Welker, LLC; Matthew T. Welker, Esq.

(57) ABSTRACT

A system and method for calculating graphite material usage and labor pricing including the following parameters: category, material, class, dimensions, and quantity. The information is used for improved efficiency via web-based graphite purchasing. The method takes into consideration the additional labor cost when very small dimensions are entered which require special work holding containment. The process requires that the user make a selection for each of the parameters so a validation step can occur ensuring the desired product can be manufactured and an accurate labor charge or quote can be provided. During the calculation step, the labor surface area is applied to the labor cost based on the calculated surface area which is derived from a second degree equation derived by a linear regression curve that is applied to the labor cost based on the calculated surface area. After the calculation step the price each and total quantity price is returned.

18 Claims, 8 Drawing Sheets

60

ILLUSTRATION A

Sign in

Please log in to place an order.

User Name [        ]

Password [        ]

[Login]  Forgot Password?

New User Register Here

ILLUSTRATION C

The Graphimator™

Would you like to REQUEST A QUOTE or PLACE AN ORDER?

| | |
|---|---|
| Order or Quote | Order ▽ |
| Select Category | Select Category ▽ |
| Select Material | Select Material ▽ |
| Select Tolerance | Select Tolerance ▽ |

Quantity / Dimensions

Quantity ☐

Dimensions

[ Validate ]

Price Each ☐ (USD)

Total Amount ☐ (USD)

**Quotes and Orders must be entered seperately and independently
Please do not attempt both in the same session.**

Quotes are only valid for 180-Days,
Quotes older than 180-Days will be purged from our system.

FIG. 8

METHOD FOR DYNAMIC ORDERING AND MATERIAL USAGE AND LABOR PRICING

CROSS REFERENCE TO RELATED APPLICATIONS

This application claims priority from U.S. Patent Application Ser. No. 61/263,851, entitled "DYNAMIC ORDERING SYSTEM AND METHOD FOR MATERIAL USAGE AND LABOR PRICING", filed on 24 Nov. 2009. The benefit under 35 USC §119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to the method and process for calculating a custom graphite rectangle. More specifically, the present invention relates to the method and process for the calculating and machining of large blocks of graphite or other material into smaller precision shapes and sizes based on a individual customer's specifications.

BACKGROUND OF THE INVENTION

The inventors business involves machining large blocks of graphite into smaller precision shapes and sizes (commonly referred to as blanks) per an individual customer's specification. The largest portion of this business is the creation of rectangular blank shapes for electrical discharge machining (EDM). EDM is typically used within machine shops for the manufacture of hardened steel molds or dies that require intricate details.

Customers have sometimes complained that pricing in certain sizes or machining tolerances did not make sense. This was due to a manufacturer's use of approximations and judgments in their calculations.

Within this industry and in the market place it is not uncommon for a manufacturer to be accused by prospects or customers of "pricing that is not easily calculated" which immediately creates a credibility problem for the sale. The industry and market is lacking a means for providing a basis of credibility, leadership, and transparency in the pricing and sales efforts.

The existing process for calculating a custom graphite rectangle requires manual calculation of material costs, mark-up percentage and machining labor costs with spreadsheet shortcuts. The current method does not account for material machining difficulty or small zone part size pricing.

Therefore what is needed is a system and method for more consistent pricing.

What is also needed is a system and method that provides more control and a greater confidence in a manufacturer's capabilities of providing fair and consistent pricing.

SUMMARY OF THE INVENTION

The present invention is a software program recorded on computer-readable medium and when executed by a computer that calculates graphite material usage and labor pricing when the above process is applied. The information can then be used for improved efficiency via web based purchasing.

The software uses the PHP and SQL software language. PHP is a widely used general-purpose scripting language that is especially suited for web development, use of database extractions and can be embedded into HTML. The software generally runs on a web server, which is configured to take PHP code as input and create web page content as output.

The present invention's software parameters include category, material, class, dimensions (X, Y, and Z) and quantity. Additionally if X, Y or Z is a very small dimension, additional labor is required to hold the part for machining. The present invention takes into consideration the additional labor cost when very small dimensions are entered which require special work holding containment.

The present invention's process requires that the software operator inputs or chooses the following information from the software interface screen. One choice must be chosen from each of variable including Category, Materials, Classes, Dimensions, Quantity, Validation, and Calculation. The Categories include the different types of commonly purchased rectangular classes that possess which surfaces are sawed or machined. Material includes twelve grades of graphite materials or any other plurality as offered. Depending on the labor difficulty a multiplier value is extracted from a database to accommodate the extra labor cost of machining difficulty. Classes include a plurality of multiple classes that are available dependent upon the category previously selected. Rectangular dimensions, in X, Y, and Z formatting is required to be entered for each. The quantity of desired pieces to be produced must also be entered. The validation step confirms that the parameters of the work piece can be manufactured. It also arranges the X, Y, and Z values from the rectangular dimensions in order from smallest to largest for entry. During the calculation step the price each and total quantity price is displayed. Additionally during the calculation step, the labor surface area is applied to the labor cost based on the calculated surface area which is derived from a second degree equation derived by a linear regression curve that is applied to the labor cost based on the calculated surface area.

The above process is used for both quotation of a regular graphite blank and placement of an order for a rectangular graphite blank.

It is therefore an objective of the present invention to provide a basis of credibility, leadership, and transparency to the pricing and sales efforts.

It is another objective of the present invention to teach a method for pricing and quotation that includes a linear regression labor curve that has been developed to eliminate any anomalies that are present in current pricing and quotation methods commonly used. There is confidence in the curve as disclosed by the present invention as it was developed using many manufacturing time studies for validation.

It is yet another objective of the present invention to teach a means and method for pricing that is easily calculated, logical and supported by a transparent itemization which immediately eliminates or greatly reduces credibility problems surrounding the quoted price and pending sale.

It is also an objective of the present invention to teach a system and method that offers more control and a greater confidence in a manufacturer's capabilities of providing fair and consistent pricing.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

FIG. 6 is a simulated screen shot of the sign in page of the user interface;

FIG. 7 is a simulated screen shot of the registration page of the user interface; and FIG. 8 is a simulated screen shot of the quotation page of the user interface.

DETAILED DESCRIPTION OF THE INVENTION

Figure 1:
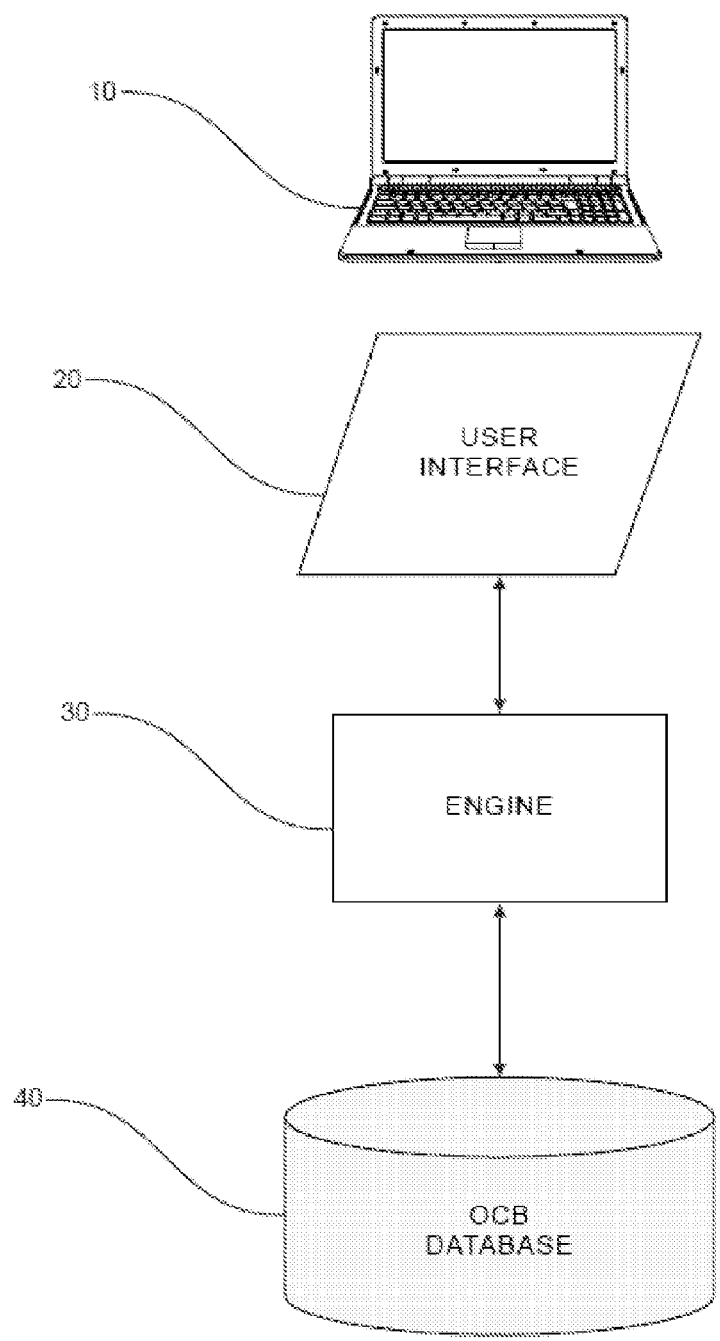
FIG. 1 contains an overview of the entire system.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The system and method of the present invention results in the machining of large blocks of graphite into smaller precision shapes and sizes, commonly referred to as blanks, per a customer's specifications. The largest portion of application of the present invention is the creation of round and rectangular electrodes for electrical discharge machining (EDM). EDM is typically used within machine shops for the manufacturing of hardened steel molds, or dies that require intricate detail.

The present invention is a user-friendly easily changeable software recorded on computer-readable medium and when executed by a computer that has been written based on well-identified parameters used for calculating work piece costs.

The method of the present invention is embodied in a software program that calculates graphite material usage and labor pricing when the steps of the method are applied. The information can then be used for improved efficiency via web based purchasing.

The software uses the PHP software language. PHP is a widely used general-purpose scripting language that is especially suited for web development, use of database extractions and can be embedded into HTML. The software generally runs on a web server, which is configured to take PHP code as input and create dynamic web page content as output.

The software parameters of the present invention include geometry, material, product category, class/tolerance, quantity, and dimensions. Additionally, if any dimensions are really small or really large, additional labor is required to hold the part for machining. The present invention takes into consideration the additional labor cost when very small or very large dimensions are entered, which require special work holding containment.

The method of the present invention requires that the software operator inputs or chooses the following information from the software interface screen. One choice must be chosen from each.

The present invention's software code allows for the use of the same format for the calculating pricing of other polygon shapes into the future. Current methods known in the art are incapable of doing this. Geometry selection currently allows two different types of geometric shapes; squares and rounds. Tubes and Hexagons will be added within the next several months.

Material selection offers fourteen different grades of graphite to choose from.

Labor difficulty provides a multiplier, representing material difficulty. Labor difficulty is extracted from a table of materials to accommodate the extra labor cost for materials that are more difficult to machine.

The present invention offers four different types of rectangular products, and three different types of rounds sorted into product categories. Each product category is determined by the number or type of ground surface(s). Various tolerance related options are available depending on the product category selected.

The user has the ability to input any quantity he wants. For rectangular shapes, the user must input three dimensions. These are displayed and labeled as XYZ—representing the width, length, and height. For rods and rounds, the user must input two dimensions, one for the diameter and one for the length. Hexagons require two dimensions as well; one for the "flat width" and the other for the length. For tubes, users must input three dimensions; one for the outer diameter, one for the inner diameter, and one for the length. To avoid confusion, each dimension field is appropriately labeled.

The present invention has a built-in validation in place to verify whether or not an item can be manufactured using the material size and the options selected. This validation is executed by pressing a validation button. This step is required before calculating a price.

The calculation button initiates the actual pricing calculations. Once the calculations are completed, the price each and the price total are then displayed on screen. The user then has the option of adding that item to their cart or calculating a new item. The user's shopping cart is provided for tracking a user's order.

At the point of checkout, the order details are displayed on screen—giving the user the ability to add or remove items from his shopping cart, or simply checkout. A confirmation is then displayed to the customer, and the order is placed. A physical order confirmation can then be printed by the customer.

In an alternative embodiment, the above process is also available with a "QUOTE" option as—giving the user the ability to receive a price without having to make a purchase—alleviating them from the checkout process.

The existing process for calculating custom graphite products requires manual calculation of material costs, markup percentage and machining labor costs with spreadsheet shortcuts. The current method does not account for material machining difficulty or "small zone" part-size pricing.

The present invention is a user friendly, easily changeable, software that has been written based on well-identified parameters used for calculating work piece costs. The present invention includes maximum and minimum block sizes so a part larger than our capabilities or smaller than our capabilities can not be calculated by displaying a message "too large or too small".

Past pricing was based on approximations and judgments. The new software's linear regression labor curve has been developed to eliminate any anomalies that are present in our current method. There is confidence in the curve as it was developed using many manufacturing time studies for validation.

The present invention software code also allows us to use the same format for the calculating pricing of other polygon shapes into the future. Current methods are incapable of doing this.

The present invention allows the prospect or customer to compare the cost of different materials on their computer. Often companies are asked on the phone or via FAX the "what if" question relative to choosing a less or more expensive material. This will require much less time for their comparisons and eliminate OCB personnel on the phone as well.

Now referring to the Figures, one embodiment of the present invention is illustrated. The system contains the primary physical components for the machine on which the method is practiced, including: a computer 10, a user interface 20, an engine 30, and a database 40.

Figure 7:
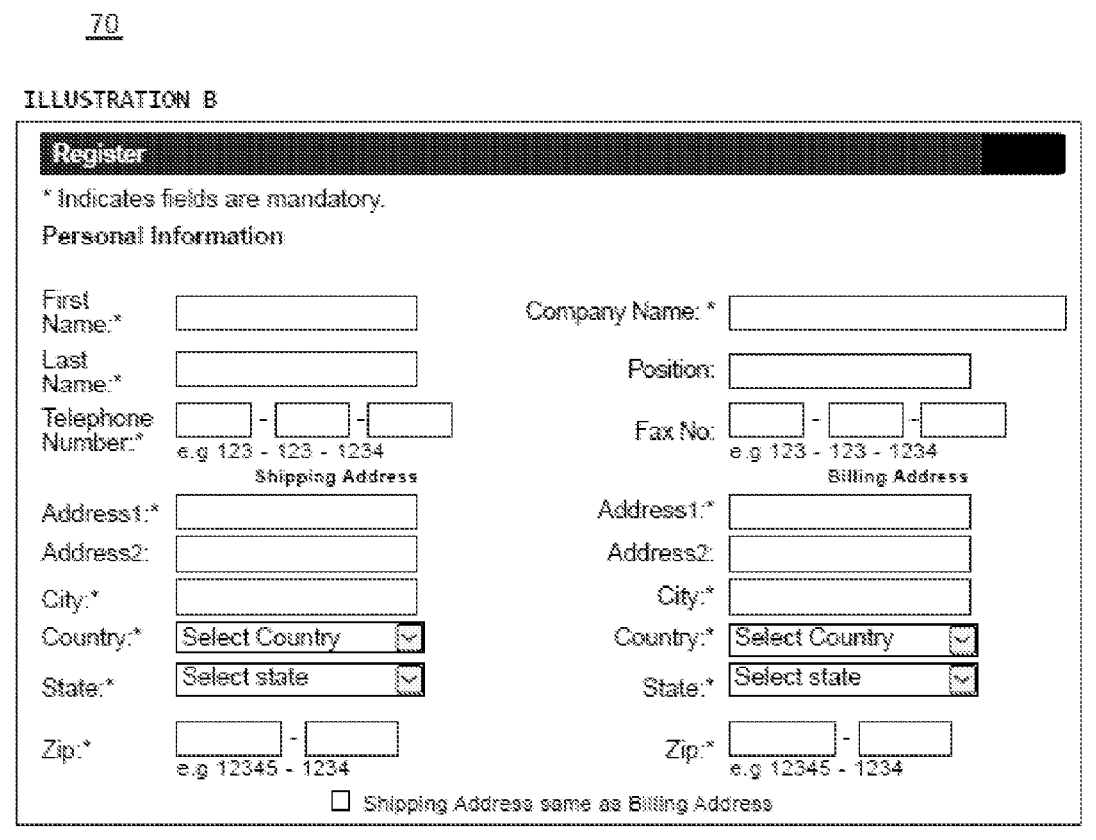

In order to access the present invention's User Interface 20, the user/customer will first be prompted to log-in. This log-in process of step 21 requires a Username and Password as shown by the login screen 60 of FIG. 6. Once the user has logged in, the system can access the Customer Database 40 in step 22 and retrieve identity information, user demographics, special privileges, and most importantly, user assigned discount. If the user does not have a Username and Password, they will be prompted to register 22 as show by the registration screen shot 70 of FIG. 7.

Figure 2:
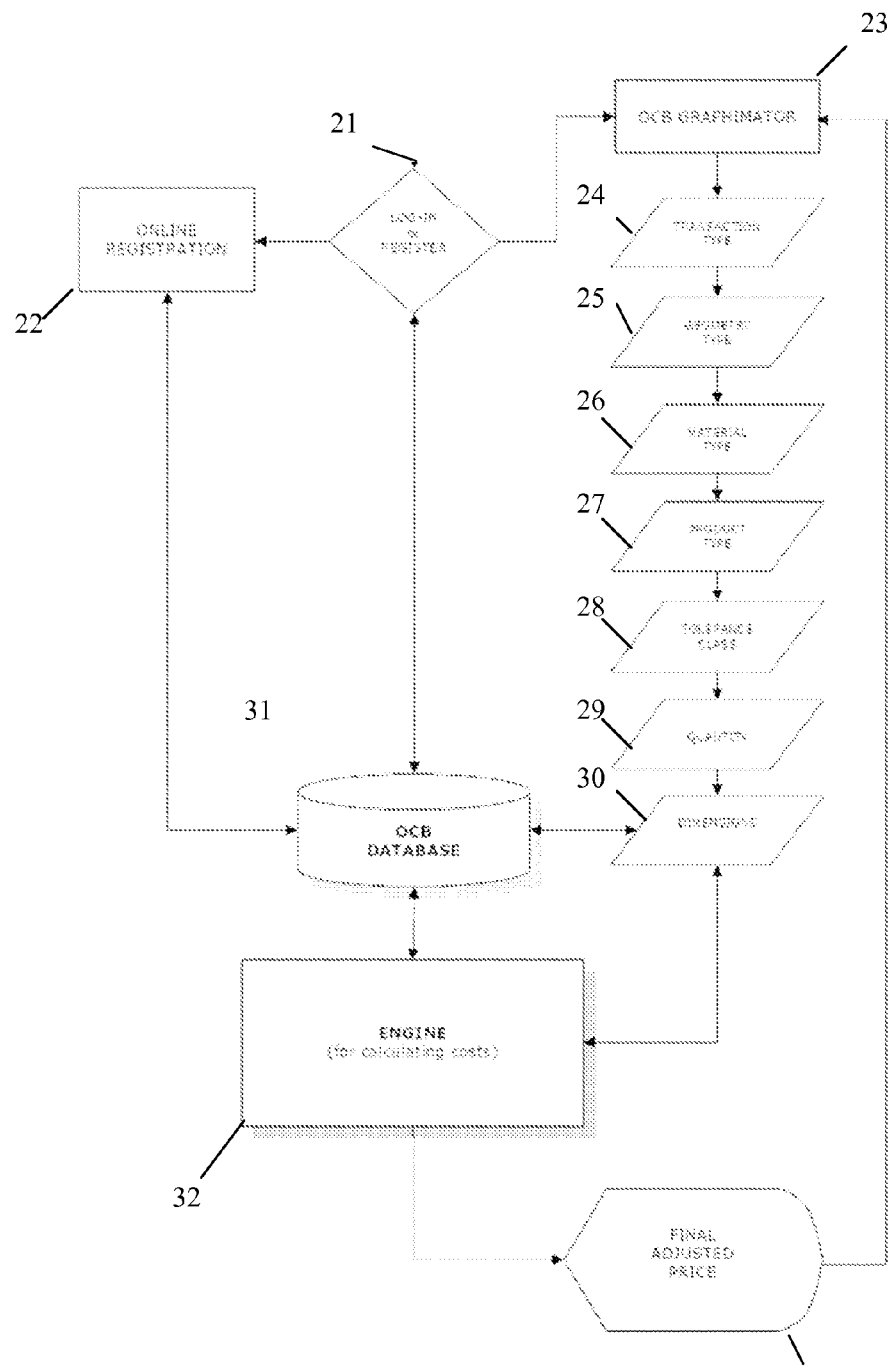
FIG. 2 is a flow chart of the user interface system.

Now referring to FIG. 2, the User Interface 20, also referred to as the "UI" 20 collects a plurality of key pieces of information from the user as in step 23 and illustrated by the simulated user interface screen 80 of FIG. 8. First, the system needs to know whether to calculate a quote or an order by determining the transaction type 24. Both are calculated the same, however quotes are logged into a database 31, are tied to a specific customer, and can be viewed at any time by either party. Orders however, are processed instantly and go directly into the online sales module.

Next, the system requires the user to input a category or geometry type 25. Categories represent the core products. Offerings can include saw-cut square, precision squares, plates, and several different kinds of rounds.

Next, the system requires the user to input a material type 26. Currently, the best mode embodiment of the present invention teaches offering twelve different materials to choose from.

Next, the system asks the user to select a class or product type 27, and a tolerance 28. The class or product type 27 represent the many different types of standard tolerances 28 that a company has to offer. For example, if a customer wants a plate with a light grind on the [X] dimension. First the user would select plate from the list of categories or geometry types 25, then the user would select light grind X from the list of available classes or product types 27. This is very important because some products are harder to manufacture than others, and some are much easier. This "class-based system" allows a user of the present invention to incorporate a modifier based on the tolerance/option selected.

The next step is to input a desired quantity 29. Finally, in order to calculate a price, the system will need some dimensions 30. For squares, these are inputted and labeled in a typical XYZ fashion. For rounds, the system uses Diameter and Length, and for tubes, an Outer Diameter, an Inner Diameter, and a Length are required.

Once the user has inputted their dimensions 30, the system 23 will validate in the database 31 whether or not the part can be manufactured. Inside the Database 31, a table contains the maximum and minimum dimensions for each of the products and materials. If the validation is successful, a new button is displayed and it gives the user the ability to calculate the price in steps 32 and 33. If validation fails, then an error message is displayed directing the user to contact sales.

Figure 3:
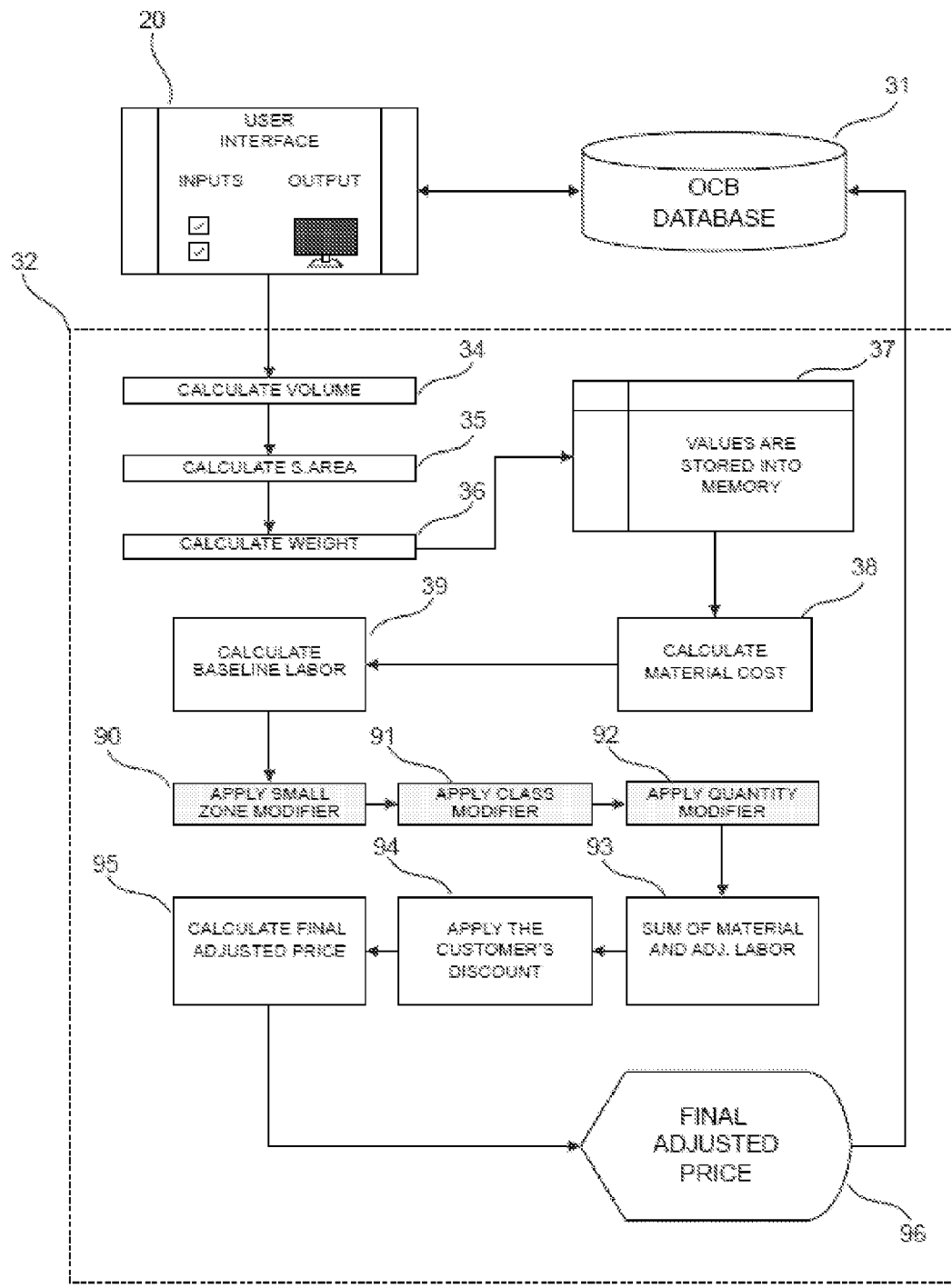
FIG. 3 is a flow chart of the actual estimator also referred to as the engine.

Now referring to FIG. 3, the core engine 32 interacts with the user interface 20 and the database 31. The core engine calculates volume 34, area 35, and weight 36 from values stored into memory 37. These calculated values are then used to calculate material cost 38 and baseline labor 39, apply the small zone modifier 90, the class modifier 91, quantity modifier 92 to determine the sum of the material and adjusted labor costs 93. Next the user/customer discount is applied 94 and the final adjusted price is calculated 95 and determined 96.

Figure 4:
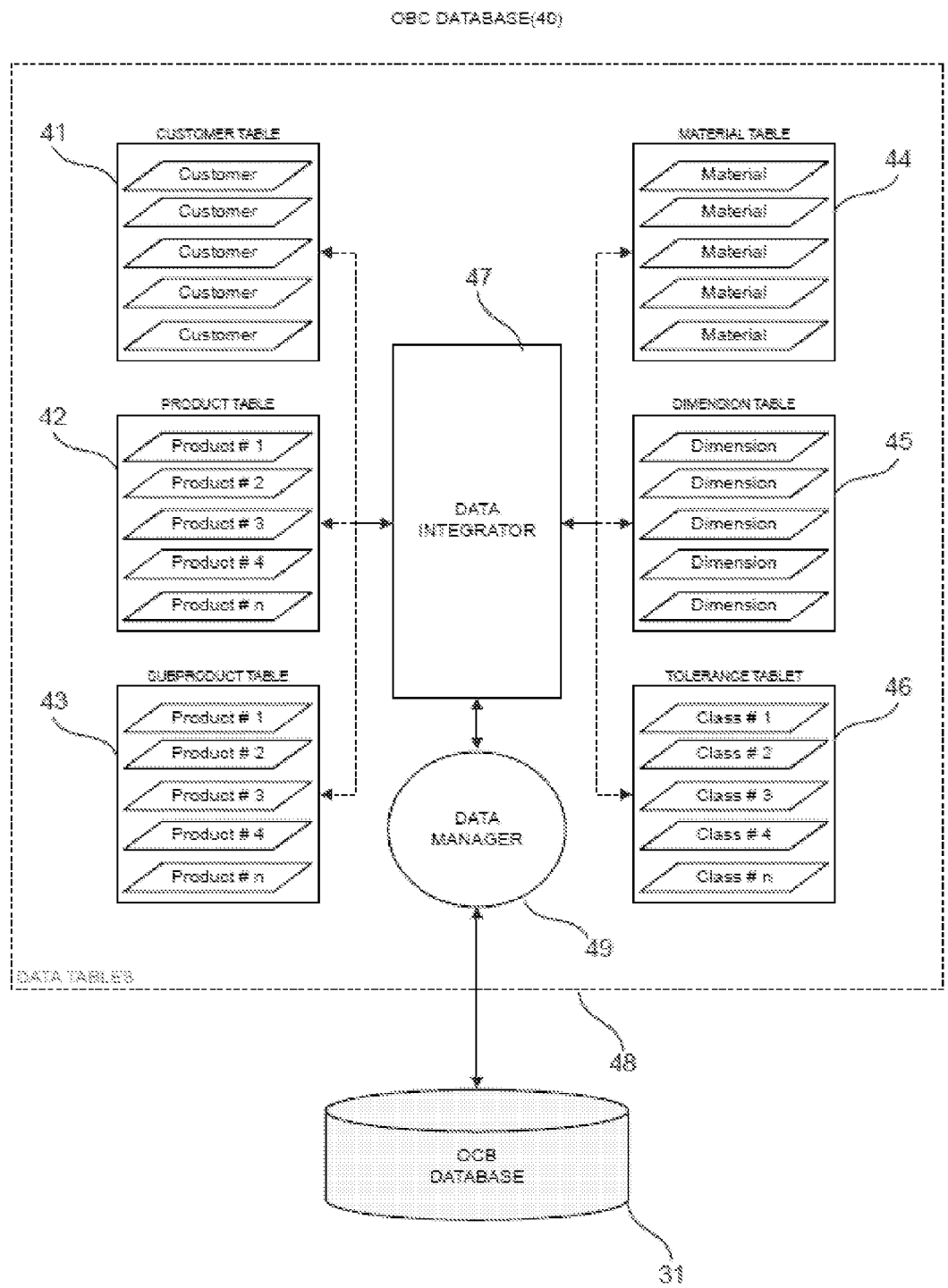
FIG. 4 is a flow chart of the O.C.B. Database.

Using PHP, the present invention is able to pull all these elements together and store them as variables within a single array in the data tables 48. This array then passes the information along to the Core Engine 32. The Core Engine 32 is made up of a Data Manager 49 and a Data Integrator 47 as shown in FIG. 4. The Data Manager 49 gathers the data and helps to manage where the information goes. The Data Integrator 47 integrates the information so that the proper calculations can be performed.

Once the calculations have been made, and the information has been processed on the server, the data is then sent back to the user so that it can be displayed on a user's screen.

Once the information has been submitted using the UI, the information is then passed through the Data Manager 48 and ends up being processed by the Data Integrator 47. The Data Integrator 47 first calculates all of the basics, such as volume(s), surface area(s), and weight(s). These values are stored into memory so that they can be used for other calculations.

The system calculates two volumes. First it calculates the "actual" volume, which is used when calculating weights, then it calculates the volume with over-cut, which is used when calculating material costs.

The system also calculates two separate surface areas. It calculates the actual surface area and the surface area with over-cut, which is used to calculate the baseline labor charge.

Using the actual volume and the material's density, which is acquired by a lookup in the database, the system then calculates the weight of each item.

Next the system calculates the material cost. Every material in the system has a cost per cubic inch amount, and that value resides in the database 40. The system looks up the material's cost by cubic inch amount and then multiplies it against the calculated volume with over-cut. This gives the overall material cost.

Next, the system calculates a baseline labor charge. Each product has it's own unique baseline labor equation. These labor equations are derived from curve fitting using non-linear regression. All rectangular items use a single, non-linear equation, in the form of an ellipse. All rounds, or cylindrical shaped items, use a combination of linear equations to calculate a baseline labor charge. There is an equation for each step of the manufacturing process, and each calculates a time (t). The sum of these times, or the total production time, is then converted into labor dollars and represents our baseline labor charge for rounds. All linear equations use the standard form: y=mx+b Material Difficulty is a factor that is incorporated to compensate for harder materials. Since some materials are harder to machine than others, and often require more time to manufacture, the method needs a way to compensate. A material difficulty factor is assigned to all the materials in the database to help counter this. This factor is a percentage, and it either increases or decreases the calculated surface area based on the material that was chosen, thus increasing or decreasing the baseline labor charge. Since manufacturing capabilities are slightly different when manufacturing rounds and other cylindrical shaped products, and since material hardness does not play as much of a role, one can eliminate this "material difficulty" factor when calculating labor for a "round".

Next, the system looks at each of the inputted dimensions. If any of the dimensions are really, really small, a modifier is added to the labor charge. Again the method uses a non-linear regression approach to derive these small zone modifier equations. Each dimension uses its own, unique small zone modifier equation as shown in Table 1.

TABLE 1

Small Zone Modifiers.

| Equation | Dimension |
| --- | --- |
| If .015 < X < .100 | Small Zone for the X-Dimension |
| If .025 < Y < .100 | Small Zone for the Y-Dimension |
| If .100 < Z < .500 | Small Zone for the Z-Dimension |

When a user inputs their dimensions, the system first looks to see if any of the dimensions fall into this small zone category. If they do, the system then uses the actual dimension and the appropriate small zone equation to calculate the modifier. The system then adds all of these small zone modifiers, and comes up with a total. This total is added to the baseline labor charge. This step is excluded when calculating labor for rounds and other cylindrical shaped products.

Once the baseline labor charge has been calculated, and any small zone modifiers have been applied, the system then looks at the requested tolerance, and applies a Class Discount or Class Modifier based on their selection.

When first evaluating the labor charges, a pattern was discovered. It was noticed that the difference in labor between a Precision Ground item and a Saw-Cut item was a constant percentage. So in programming the system and developing the method of the present invention, it was decided to follow suit and implement a class modifier that would discount an item based on the number of ground surfaces.

Next, the system looks at the desired quantity field. If the desired quantity is greater than zero, but less than twenty four pieces, then the system inflates the price by a certain percentage. This is because the "set up time" for small quantities is more costly than with large quantities. When quantities are greater than twenty four pieces, it has been determined that these "set-up times" nearly disappear. Therefore, to compensate for small quantities it has been decided to implement a Quantity Modifier. The Quantity Modifier is calculated by using another non-linear equation. This quantity modifier is calculated using yet another non-linear equation: "Quantity Modifier"=A*LN(X)+B. Where X="the desired quantity" and A & B are pre-defined. This quantity modifier add-on is not required when calculating labor or rounds and cylindrical shaped products. This is because the "quantity modifier" has already been built-in to each of the individual baseline labor equations.

Once the system has calculated the baseline labor, added any small zone modifiers, discounted the item based on it's class, and has applied the Quantity Modifier, it can then calculate the Final Adjusted Labor as shown in Table 2.

TABLE 2

Final Adjusted Labor Calculation.

| | Equation |
| --- | --- |
| Adjusted Labor1 = | [BASELINE LABOR] + [SMALL ZONE MODIFIERS] |
| Adjusted Labor2 = | [ADJUSTED LABOR1] * [CLASS MODIFIER] |
| Final Adjusted Labor = | [ADJUSTED LABOR2] * [QUANTITY MODIFIER] |

The Final Adjusted Labor is then added to the Material Price, which results in the calculated "List Price". Once the system has calculated the "list price" for an item, it then retrieves the customer's discount from the database, and discounts the item appropriately—resulting in the Final Adjusted Price. Once the Final Adjusted Price has been calculated on the server, the information then gets passed to the user's computer screen via the Internet or other wide or local network connection.

The method and system of the present invention requires the use of a database 40 as shown in FIG. 4. This database 40 contains six data tables 41, 42, 43, 44, 45, and 46. Each are required in order for the system to work. The Customer Information Table 41 houses information relative to the contacts and customers; Billing Info, Shipping Info, Credit Terms, and Discounting.

The Product Information table 42 contains information regarding basic geometry. It contains descriptions, dimensional labels, and all the required volume equations and surface area equations.

The Subproduct table 43 contains information regarding the core products. All of the baseline labor equations can also be found in this table.

The Material Information table 44 contains information regarding all the materials; material specs, material densities, and material difficulties.

The Dimensions Table 45 contains the maximum and minimum dimensions for each of the products and materials.

The Tolerance Information table 46 contains the actual tolerances on each dimension for all of the products. It also contains the class modifier as well.

The Data Integrator 47 collects the data, formats the data, and performs all the required calculations.

The Data Manager 49 has two primary functions, it extracts information and it stores information. All of the equations need to be extracted, material information needs to be extracted, product information needs to be extracted, and customer information needs to be extracted. All of these extractions are executed by the Data Manager 49.

Whenever the system receives an order or a quote request, the information is logged and saved in the system. The Data Manager 49 saves the information and ties it to the customer and their account number.

Figure 5:
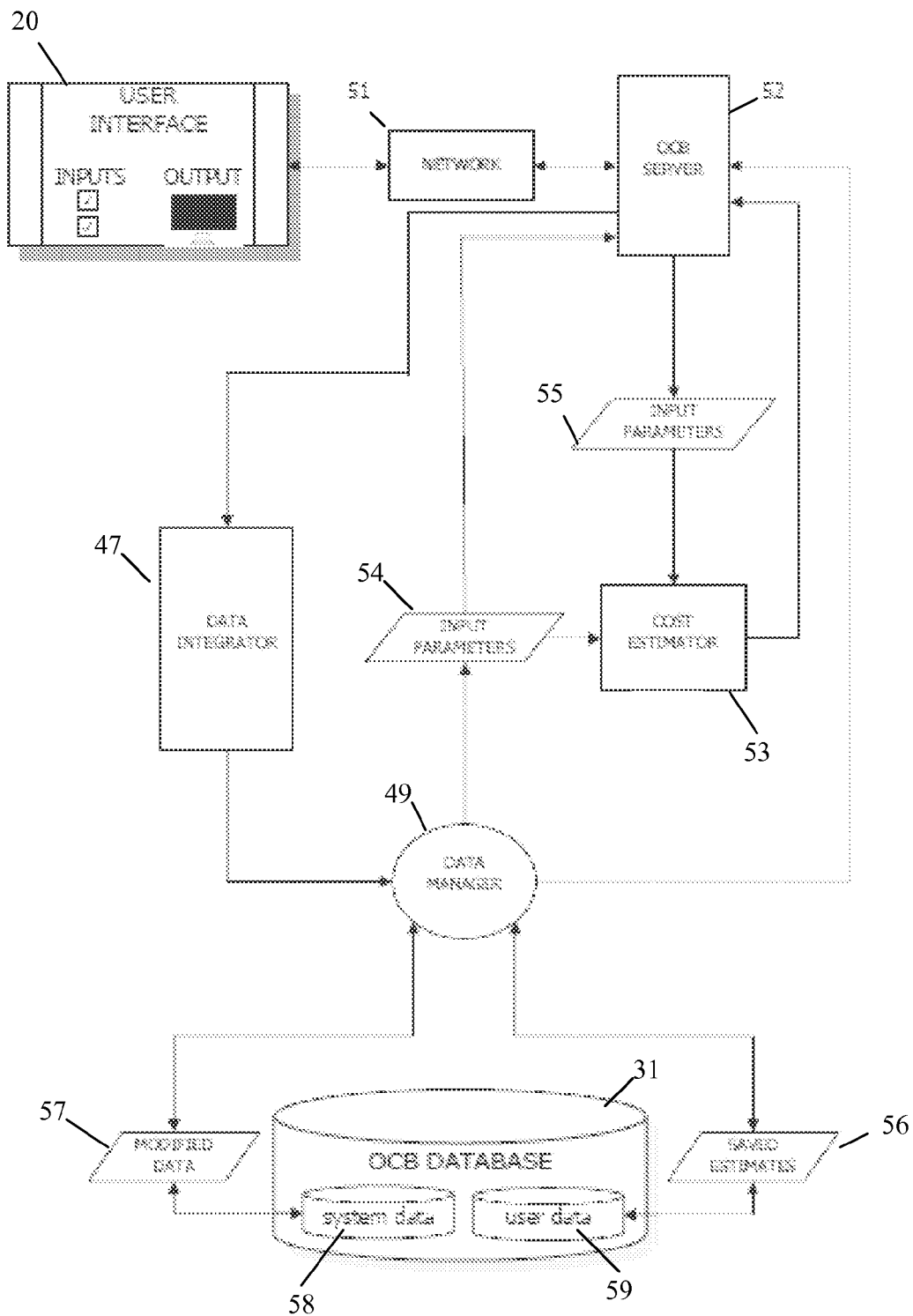
FIG. 5 is a flow chart of the entire "networking" system (the user interface, the internet, the in-house server, the core engine model, and the customer database)

Finally, referring to FIG. 5, the entire "networking" system including the user interface 20, the internet/network 51, the in-house server 52, the core engine model, the cost estimator 53, data integrator 47, data manager 49 and the database 31 are shown. The user interface 20 provides access to the system server 52 via a network such as the Internet 51. The system server 52 received input parameters 54 from the data manager 49 and sends input parameters 55 to the cost estimator 53. The data manager 49 receives information from the data integrator 47 and saved estimates 56 and modified data 57 from the system data 58 and user data 59 stored in the database 31 for transfer to the data manager 49.

The above process is used for both quotation of a rectangular graphite blank and placement of an order for a rectangular graphite blank. Although the invention as disclosed is particularly for rectangular or square shapes, it is readily adaptable to other standard shapes such as rounds (pencil shaped) or other multi-sided polygons. One of ordinary skill in the art would find it obvious to adapt the present invention to any standard shape known or commonly used in the industry. Current methods known in the art are incapable of doing this, although it would be an advantageous and obvious adaptation of the present invention.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for calculating graphite material usage and labor pricing, wherein the method comprises the steps of:
    collecting information from a user;
    determining whether to calculate a quote or an order;
    entering information including a category or geometry type, a material, a class or a tolerance, a desired quantity, and one or more dimensions;
    validating, using a server computer, whether a part can be manufactured based on the entered information;
    calculating an actual volume, an over-cut volume, an actual surface area, and an over-cut surface area for the part;
    calculating a weight for the part using the actual volume and a density of the material obtained by a database lookup;
    storing the calculated values in a memory for use in other calculations;
    calculating a material cost by multiplying a cost by cubic inch against the calculated over-cut volume;
    calculating a baseline labor charge;
    processing the information on the server computer by storing it in the database; and
    sending the information back to the user in the format of a price quote so that it can be displayed on a screen.

2. The method of claim 1 wherein, the category or geometry type includes one or more from the group including:
    a. saw-cut rectangles;
    b. precision squares;
    c. plates, and
    d. rounds.

3. The method of claim 1 wherein, the class represents a plurality of different types of standard tolerances that a company has to offer.

4. The method of claim 1 further comprising the step of:
incorporating a modifier based on the tolerance.

5. The method of claim 1, further comprising the step of:
inputting and labeling dimensions for a square product including a length, a width, and a height.

6. The method of claim 1, further comprising the step of:
inputting and labeling a diameter and a length dimension for a tube product.

7. The method of claim 1, further comprising the step of:
inputting and labeling an outer diameter, an inner diameter, and a length dimension for a round product.

8. The method of claim 1 further comprising the steps of:
providing a database with tables containing a maximum and a minimum dimension for each of a plurality of possible products and materials; and
wherein the validation is further based on at least a subset of the maximum and minimum dimensions stored in the database.

9. The method of claim 1 further comprising the step of:
logging the price quote into the database;
providing the price quote to a specific customer; and
providing access to the quote by the user or a manufacturer.

10. The method of claim 1 further comprising the steps of:
determining a unique baseline labor equation for a product; and
calculating the baseline labor charge by curve fitting using non-linear regression.

11. The method of claim 1 further comprising the steps of:
determining a unique baseline labor equation for a product; and
wherein the calculation of the baseline labor charge is performed for one or more round items and one or more cylindrical items by curve fitting one or more linear equations.

12. The method of claim 1, wherein the calculated baseline labor charge is based on a total production time of one or more steps in a manufacturing process associated with a manufacturing of the part.

13. The method of claim 1 further comprising the steps of:
assigning a material difficulty factor to the material, wherein the factor is a percentage;
adjusting the calculated actual surface area by the percentage.

14. The method of claim 1 further comprising the steps of:
reviewing each of the entered one or more dimensions;
determining if a small zone modifier should be added to the baseline labor charge;
calculating the small zone modifier using the entered one or more dimension and a small zone modifier equation;
determining a total small zone modifier from the small zone modifier and one or more additional small zone modifiers; and
adding the total small zone modifier to the baseline labor charge.

15. The method of claim 14 further comprising the steps of:
reviewing the entered tolerance; and
applying a class discount or a class modifier based on the entered tolerance.

16. The method of claim 15 further comprising the steps of:
inflating the price quote by a percentage if the quantity is greater than zero, but less than twenty-four pieces; and
calculating a quantity modifier by using a non-linear equation if the quantity is equal to or greater than twenty-four pieces.

17. The method of claim 15 wherein, the non-linear equation is: "Quantity Modifier"=A*LN(X)+B, where X="the desired quantity" and A and B are pre-defined.

18. The method of claim 15 further comprising the steps of:
calculating a first preliminary adjusted labor by adding the baseline labor and the small zone modifier;
calculating a second preliminary adjusted labor by multiplying the first preliminary adjusted labor by the class modifier; and
calculating a final adjusted labor by multiplying the second preliminary adjusted labor by a quantity modifier.

* * * * *